Sept. 23, 1969          L. L. FUSBY          3,468,627

PRODUCTION OF BORIC OXIDE

Filed June 22, 1966

INVENTOR.
LLOYD L. FUSBY

BY
James R. Thornton
AGENT

3,468,627
PRODUCTION OF BORIC OXIDE
Lloyd L. Fusby, Los Angeles, Calif., assignor to United States Borax & Chemical Corporation, Los Angeles, Calif., a corporation of Nevada
Continuation-in-part of application Ser. No. 432,652, Feb. 15, 1965. This application June 22, 1966, Ser. No. 563,015
Int. Cl. C01b 35/00
U.S. Cl. 23—149          13 Claims

ABSTRACT OF THE DISCLOSURE

Vitreous boric oxide is obtained by mixing sulfuric acid and an alkali metal and/or alkaline earth metal borate to form a feed mixture, heating this mixture at an elevated temperature of at least about 750° C. to form a two layer molten reaction product mixture, separating the layers while molten and then cooling the separated layers to obtain vitreous boric oxide and by-product metal sulfate as solid fused products. Solid vitreous boric oxide compositions containing a small amount, up to about 10%, of sodium, potassium and/or calcium oxide dissolved therein are also provided. Optionally, the product can also contain a minor amount of refractory oxide, such as aluminum, silicon, titanium and zirconium oxide, dissolved therein. The products have a low rate of moisture pick up and possess improved grinding properties.

---

This application is a continuation-in-part of my co-pending application Ser. No. 432,652 filed Feb. 15, 1965 and now abandoned.

This invention relates to the production of boric oxide, and more particularly, this invention relates to a method for producing a novel vitreous boric oxide composition directly from metal borates and sulfuric acid.

Boric oxide finds many uses in industry, especially in applications in which a high $B_2O_3$ content material, containing no oxides of the alkali or alkaline earth metals, is desired. Thus, the oxide is used in the production of many special glass compositions, fiber glass, enamels, alloys, in the preparation of fluxes, frits, and as a catalyst in organic reactions. However, the price of boric oxide has remained relatively high because of the price of the raw materials as well as the complex processing conditions required for its production. Boric oxide is made commercially by heating boric acid at an elevated temperature over a relatively long period of time. The boric acid is generally obtained by reaction of borax or colemanite with sulfuric acid or hydrochloric acid in an aqueous medium. Therefore, a simple straightforward process for making boric oxide directly from low-cost raw materials is considered to represent a significant advance in the art of inorganic borates.

The present invention provides a facile method for producing a vitreous boric oxide product directly from low-cost raw materials. The resultant boric oxide product has a high $B_2O_3$ content of at least about 90% and is therefore especially useful for applications requiring a high $B_2O_3$ content material associated with a low amount of alkali or alkaline earth metal oxide. The present method also provides valuable alkali metal or alkaline earth metal salts as by-products in a highly pure form.

The method provided by this invention comprises intimately mixing sulfuric acid and a metal borate selected from the group consisting of the alkali and alkaline earth metal borates to form a feed mixture, heating said feed mixture to an elevated temperature, such as at least about 750° C., to form a two layer molten reaction product mixture, separating said layers while molten and cooling said separated layers to obtain vitreous boric oxide as a solid, fused product. The corresponding alkali or alkaline earth metal sulfate is obtained as a valuable by-product in a highly pure form.

Figure 1:
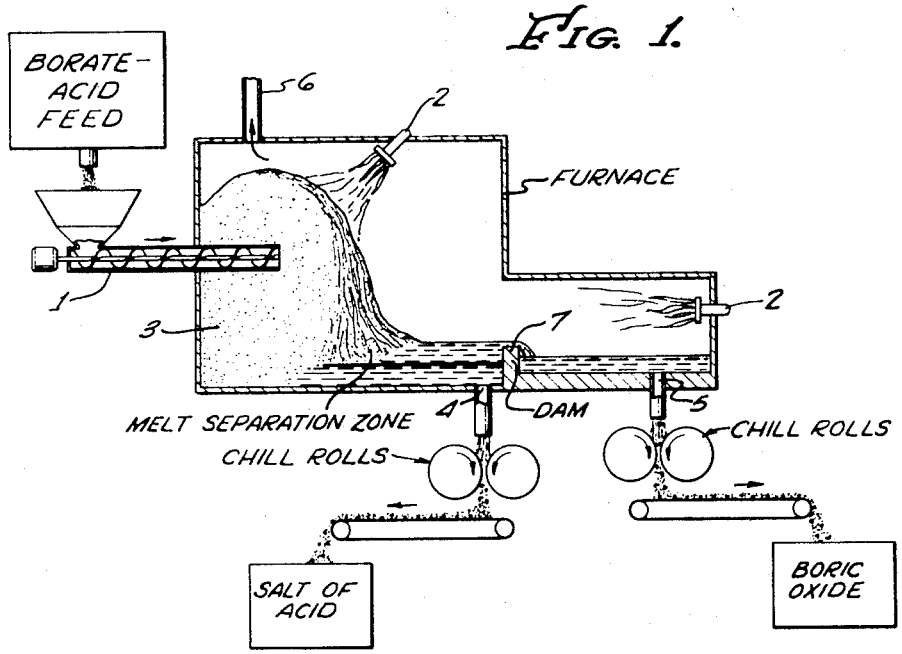
Figure 2:
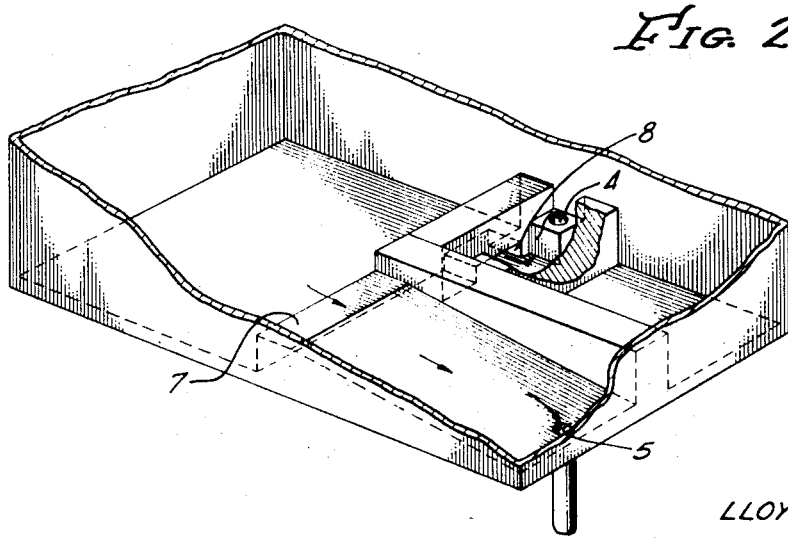

Referring to the accompanying drawings, FIG. 1 is a diagrammatic representation of a flow sheet for the continuous production of boric oxide and metal sulfate in accordance with the method of this invention. FIG. 2 is a view of the bottom of a furnace suitable for use in the present process.

The feed for the present process is prepared by intimately mixing sulfuric acid with one or more of the metal borates, preferably in substantially equimolar amounts. A slight excess of either reactant can be used if desired, and can offer some advantages. For example, use of up to about 10%, by weight, excess sulfuric acid appears to result in a higher purity boric oxide product.

The sulfuric acid employed as a reactant should have at least about 78% $H_2SO_4$ and, preferably, is concentrated sulfuric acid of at least about 90% $H_2SO_4$, usually about 96–98% $H_2SO_4$. Super concentrated sulfuric acid, such as oleum, can also be used if desired, but it does not appear to offer any special advantages.

The metal borates useful in the present process are the alkali metal borates, the alkaline earth metal borates, or mixtures thereof. Examples of such borates include sodium tetraborate ($Na_2B_4O_7$), potassium tetraborate, sodium pentaborate, and hydrates thereof, as well as the borate ores such as colemanite ($Ca_2B_6O_{11} \cdot 5H_2O$), ulexite ($NaCaB_5O_9 \cdot 8H_2O$), and mixtures of refined and unrefined borates. Due to economics and ready availability, the preferred borate reactants are sodium tetraborate and its hydrates, such as sodium tetraborate pentahydrate and sodium tetraborate decahydrate (borax). The presently preferred borate is sodium tetraborate pentahydrate.

In a preferred embodiment of this invention, about equimolar amounts of a hydrated sodium tetraborate, such as the pentahydrate, and concentrated sulfuric acid, or a slight excess of the acid, are combined in a mixing vessel at about ambient temperature. The reactants are intimately mixed to provide a paste-like mixture which in a short time becomes a susbtantially dry-appearing mixture of granular feed. Due to the substantial absence of uncombined water, that is, free water which is not chemically combined with the borate to form a hydrate nor is present as diluent water in the sulfuric acid, the feed is a free-flowing, "dry," granular mixture which is readily handled, transported and stored. Although the feed mixture generally goes through a pasty stage, it is not necessary and conversely the pasty mixture per se can be used as feed.

The feed mixture is fed to a furnace, such as a gas-fired furnace as illustrated by the accompanying drawings, wherein the mixture is heated at an elevated temperature such as at least about 750° C. and, preferably, in the range of from about 800° to about 900° C. The upper temperature range is not critical but should not be so high as to vaporize the products or cause undue corrosion of the furnace lining. A temperature of about 1090° C. is generally sufficient but temperatures of as high as about 1200° C. or higher can be used if desired. The reaction mixture forms two molten layers, with molten boric oxide comprising the upper layer and molten sodium sulfate comprising the lower layer. The molten layers are separated preferably soon after formation, that is less than about 1–2 hours after being fed to the furnace. Although longer retention times can be used, it is generally preferred to separate the two layers soon after formation since it appears that the amount of alkaline impurities in the boric oxide increases with longer periods of contact between the two layers.

Separation of the two molten layers can be obtained by the use of dams or weirs on the furnace floor as illustrated in the accompanying drawings. However, the present process is not restricted to this means of separating the layers, since other techniques would be applicable.

Preferably, after separation of the two molten layers, the boric oxide layer is retained in the furnace for a longer period of time, such as up to about 1–2 hours, or longer if desirable, and heating of the layer continued at about the reaction temperature or higher. It has been found that the continued heating of the molten boric oxide layer removes gaseous impurities such as water and $SO_3$. Any sodium sulfate retained in the boric oxide appears to break down and the $SO_3$ goes off as a gas.

After separation, each layer is discharged separately from the furnace and cooled to provide the solid $B_2O_3$ product and by-product salt. A particularly useful means for cooling and solidifying the molten product is to feed the molten material directly to chilled rolls. The product solidifies on the roll, falls off or is scraped off, is then cooled and crushed to the desired size to provide a fused, glassy boric oxide product. The by-product salt can be cooled and solidified in a similar manner.

The vitreous boric oxide product obtained by the present method has a high $B_2O_3$ content, usually in excess of 90% and, when sodium tetraborate is employed as a reactant, generally at least about 95% $B_2O_3$. The product has a relatively small amount of alkaline material in the form of the oxide, such as $Na_2O$, $K_2O$, $CaO$, etc. and can be used in many applications requiring a high $B_2O_3$ content product.

The by-product sulfate, and especially sodium sulfate obtained according to the preferred embodiments of this invention, is a granular material which can be used in many applications requiring a high purity sodium sulfate.

The method of this invention is readily adapted to a continuous process. Referring to the accompanying drawing, FIG. 1 is a diagram of a continuous process and FIG. 2 is a diagram of the floor of a suitable furnace. A granular feed material is prepared by combining the sulfuric acid with the alkali or alkaline earth metal borate and the feed is continually fed, such as by means of a screw conveyor 1, to a furnace maintained at the reaction temperature by means of gas burners 2. The feed mixture is fed to the back of a pile of the feed 3 in the furnace which is continuously melting and separating into two layers as it reaches the fusion temperature. The lower molten salt layer is separated by means of a dam 7 in the furnace which allows the upper molten layer to continue to flow through the furnace but blocks the molten salt which is continuously removed through an opening 4 below the separation level of the lower layer. The upper layer flows over the dam 7 and is subjected to further heating at the elevated temperature in order to remove gaseous impurities. The upper layer is then continuously removed from the furnace by means of an opening 5 beyond the dam 7. Both the molten salt and molten boric oxide layer are continuously fed to chilled roll coolers which are slowly rotating. The molten products solidify on the rolls, are continuously scraped off and then subjected to crushing and sizing to give the desired products. Gaseous impurities and by-products exit through vent 6.

FIG. 2 is a diagram of the floor of a suitable furnace which can be used for this process. The molten boric oxide flows over the dam or weir 7 and exits through opening 5. The molten salt of sulfuric acid flows through opening 8 below the level of the dam 7 and exits through opening 4, which can be raised off the floor of the furnace so as to skim the molten salt from the top of the salt layer.

The method of this invention is illustrated by the following examples, but it is to be understood that the invention is not limited to the specific examples given.

Example I

A mixture of 287 grams of sodium tetraborate pentahydrate and 102 grams of concentrated (96%) sulfuric acid was prepared. Some warming of the mixture occurred when it was prepared but the resultant reaction mixture was a dry-appearing, free-flowing granular material. This mixture was placed in a clay crucible and heated in a furnace at 1650° F. (899° C.) for 20 minutes. The upper molten layer was separated by decentation and this layer was then heated again at 1740°–1830° F. (949°–999° C.) for 15 minutes. This layer was then cooled to give a transparent, solid glassy product which was found to contain 93.2% $B_2O_3$ and 4.7% $Na_2O$.

Example II

A mixture of 95.6 grams of sodium tetraborate pentahydrate and 34 grams of concentrated sulfuric acid was prepared as described in Example I. This mixture was placed in a clay crucible and heated for 20 minutes at 1740°–1830° F. (949°–999° C.) The upper molten layer was separated and then heated for an additional 30 minutes at 1830° F. The material was then cooled to give a transparent, solid glassy product which was found to contain 97.02% $B_2O_3$ and 2.26% $Na_2O$.

Example III

A mixture of 40.5 grams of ulexite ($NaCaB_5O_9 \cdot 8H_2O$) and 14.7 grams of 96% sulfuric acid was prepared. The reactant mixture, which was a dry-appearing, granular material, was placed in a platinum crucible and heated at about 1940° F. (1060°C.) for about 0.5 hour. The upper layer was separated and cooled to give a transparent, glassy product which was found to contain 93.21% $B_2O_3$ and 3.4% alkalinity expressed as $Na_2O$.

Example IV

Using a furnace similar to the accompanying drawing FIG 2, a substantially stoichiometric mixture (equimolar with correction for 4% water in sulfuric acid) of sodium tetraborate pentahydrate and 96% sulfuric acid was continuously fed to the furnace at a rate of 40 pounds per hour. The melting zone was maintained at about 1597° to 1650° F. (870°–899° C.) and, after separation of the molten layers, the upper $B_2O_3$ layer was maintained at about 1405° to 1550° F. (788°–843° C.). The molten layers were continuously removed and cooled to provide the solid fused boric oxide product which was found to contain 94.7% $B_2O_3$ and 3.5% $Na_2O$. The solid by-product sodium sulfate was 99+% $Na_2SO_4$.

Example V

In another run as described in Example IV, the granular feed mixture was continuously fed to the furnace maintained at a temperature in the range of about 1500°–1690° F. (816°–821° C.), at a rate of 28.3 pounds per hour. The molten boric oxide layer had a residence time of 0.75 hour and the molten sodium sulfate layer had a residence time of 0.6 hour. The resultant boric oxide product contained 95.9% $B_2O_3$, 2.73% $Na_2O$, 0.29% $SiO_2$, and 0.23% $Al_2O_3$. The furnace had a refractory lining and the refractory oxides in the product were dissolved out of the lining.

Example VI

A feed mixture was prepared by intimately mixing 2000 grams of sodium tetraborate decahydrate with 557 grams of 96% $H_2SO_4$ at ambient temperature. The resultant mixture was placed in a clay crucible and heated to a temperature of about 1200° C. in a gas-heated pot furnace for about 15 minutes. The upper layer was separated and cooled. The resultant product was found to contain 92.7% $B_2O_3$.

The boric oxide compositions produced by the present process have improved physical properties not obtained with pure boric oxide. For example, the preferred boric oxide compositions containing from about 1 to about 10%, by weight, of alkali or alkaline earth metal oxide have a much lower rate of moisture pickup when finely divided than pure boric oxide not containing the alkaline oxides. Also, they possess improved grinding properties; they do not tend to pick up a static charge and it has been found that they will splinter into angular fragments to give readily screened, finely divided material.

Preferably, the novel boric oxide compositions of this invention contain from about 3 to about 6%, by weight, of alkali or alkaline earth metal oxide which is preferably sodium oxide. The compositions can also contain minor amounts of other inorganic oxides, especially the refractory oxides, such as $Al_2O_3$, $SiO_2$, $TiO_2$, and $ZrO_2$, but the total amount of inorganic oxides including the alkali metal, alkaline earth and refractory oxides should not be in excess of about 10% by weight, preferably not more than about 6% by weight. The alkali metal oxides appear to act as solubilizing agents for the less soluble refractory oxides such as $Al_2O_3$ and $ZrO_2$, therefore enabling one to dissolve a larger amount of these oxides than would be possible if they were dissolved as a sole additive.

Example VII

To demonstrate the superior physical properties of the finely divided boric oxide compositions of this invention, samples of pure boric oxide and boric oxide containing 6.57% and 9.17% by weight of $Na_2O$ were crushed and screened. The particles were exposed in single particle deep layers to the atmosphere in a desiccator containing a saturated solution of magnesium chloride at a temperature of 75° F. This solution produces a constant atmosphere of 32% relative humidity. Moisture pickup was determined from the gain in weight of the material. After six days of exposure, pure boric oxide had gained 5.2% in weight and boric oxide samples containing 6.58% and 9.17% sodium oxide had gained 1.7% and 1.1% in weight, respectively.

Example VIII

A sample of boric oxide containing a mixture of 3.20 % $Na_2O$ and 3.20% $SiO_2$ (a total of 6.40% inorganic oxides) was exposed to a humid atmosphere as in Example VII, resulting in a weight gain of 1.3% in six days.

Example IX

A sample of boric oxide containing a mixture of 1.93% $SiO_2$ 1.07% $Al_2O_3$, and 2.87 $Na_2O$ (a total of 5.87% inorganic oxides) was exposed to a humid atmosphere as described in Example VIII, resulting in a weight gain of 1.1% after six days.

Example X

A sample of boric oxide containing a mixture of 1.6% CaO and 1.2% $Na_2O$ dissolved therein (2.8% total inorganic oxides) was exposed to a humid atmosphere as in Example VII, resulting in a weight gain of 0.8% after six days.

Example XI

A sample of boric oxide containing 1.1% $TiO_2$ and 4.1% $K_2O$ dissolved therein (a total of 5.2% inorganic oxides) was exposed to a humid atmosphere as in Example VII, resulting in a weight pain of 1.7% after six days.

The boric oxide compositions can be prepared according to the process of the present invention or by merely dissolving the additive oxides in molten boric oxide as described in the application of George W. Campbell, Jr., Nelson P. Nies and Johnny C. Atteberry, Ser. No. 559,391, filed on even date herewith.

Various changes and modifications of the invention can be made and, to the extent that such variations incorporate the spirit of this invention, they are intended to be included within the scope of the appended claims.

I, therefore, claim as my invention:

1. The method for producing vitreous boric oxide of at least 90% purity which comprises intimately mixing sulfuric acid of at least about 78% $H_2SO_4$ and a metal borate selected from the group consisting of the alkali metal and alkaline earth metal borates and mixtures thereof to form a feed mixture, heating said feed mixture at a temperature of at least about 750° C. to form a two layer molten reaction product mixture, separating said layers while molten, and cooling said separated layers to obtain vitreous boric oxide as a solid fused product.

2. The method for producing vitreous boric oxide of at least 90% purity which comprises intimately mixing sulfuric acid of at least about 78% $H_2SO_4$ and a metal borate selected from the group consisting of the sodium, potassium and calcium borates, and mixtures thereof to form a feed mixture, heating said feed mixture at a temperature in the range of from about 750° C. to about 1200° C. to form a two layer molten reaction product mixture, separating said layers while molten and cooling said separated layers to obtain solid fused boric oxide product.

3. The method for producing vitreous boric oxide of at least 90% purity and sodium sulfate which comprises intimately mixing substantially equimolar amounts of sodium borate and concentrated sulfuric acid to form a substantially dry-appearing feed mixture, heating said feed mixture at a temperature in the range of from about 750° to about 1090° C. to form a two layer reaction product mixture comprising an upper layer of molten boric oxide and lower layer of molten sodium sulfate, separating said layers while molten, and cooling said separated layers to obtain solid fused boric oxide and sodium sulfate.

4. The method of claim 3 in which said sodium borate is sodium tetraborate pentahydrate.

5. The method for producing vitreous boric oxide of at least 90% purity which comprises intimately mixing substantially equimolar amounts of sodium borate and concentrated sulfuric acid to form a substantially dry-appering feed mixture, heating said feed mixture at an elevated temperature in the range of from about 800° to about 900° C. to form a two layer reaction product mixture comprising an upper layer of molten boric oxide and lower layer of molten sodium sulfate, separating said layers while molten, continuing to heat said layer of molten boric oxide at said elevated temperature to remove gaseous impurities, and cooling said boric oxide layer to obtain solid fused boric oxide.

6. The method of claim 5 in which said sodium borate is sodium tetraborate pentahydrate.

7. The continuous process for producing vitreous boric oxide of at least 90% purity and metal sulfate salt which comprises continuously feeding a reactant mixture, formed by combining sulfuric acid of at least about 78% $H_2SO_4$ with a metal borate selected from the group consisting of the alkali metal and alkaline earth metal borates and mixtures thereof, to a furnace and heating said reactant mixture at a temperature of at least about 750° C. to form a two layer molten reaction product mixture, continuously separating said layers while molten, continuously removing said separated layers from said furnace, and cooling said separated layers to obtain vitreous boric oxide as a solid fused product and metal sulfate salt as a solid product.

8. The continuous process for producing vitreous boric oxide of at least 90% purity and sodium sulfate which comprises continuously feeding a substantially dry-appearing reactant mixture, formed by combining about equimolar amounts of concentrated sulfuric acid and sodium borate, to a furnace and heating said reactant mixture at a temperature in the range of from about 750° to about 1090° C. to form a two layer molten reaction product mixture comprising an upper layer of molten boric oxide and a lower layer of molten sodium sulfate, continuously separating said layers while molten, continuously removing said separated layers from said furnace, and cooling said separated layers to obtain vitreous boric oxide as a solid fused product and sodium sulfate as a solid product.

9. The process according to claim 8 in which said sodium borate is sodium tetraborate pentahydrate.

10. The process according to claim 8 in which said upper layer of molten boric oxide is heated after separating said layers, thereby removing gaseous impurities.

11. The method for producing vitreous boric oxide of at least 90% purity which comprises heating an admixture of about equimolar amounts of sulfuric acid of at least about 78% $H_2SO_4$ and an alkali metal borate selected from the sodium and potassium borates to an elevated temperature of at least about 750° C. to form a two layer molten reaction product mixture comprising boric oxide as the upper layer and alkali metal sulfate as the lower layer, separating said layers while molten and cooling said separated layers to obtain vitreous boric oxide and alkali metal sulfate as solid products.

12. The method according to claim 11 in which said alkali metal borate is sodium tetraborate.

13. The method according to claim 11 in which said sulfuric acid is concentrated sulfuric acid of about 96–98% $H_2SO_4$.

References Cited

UNITED STATES PATENTS

| 1,269,170 | 6/1918 | Faulkner. | |
|---|---|---|---|
| 1,888,391 | 11/1932 | Newman | 23—149 |
| 2,527,618 | 10/1950 | Bozich | 23—149 X |
| 2,898,192 | 8/1959 | Harman | 23—149 |
| 3,224,843 | 12/1965 | Morgan et al. | 23—149 X |
| 3,230,042 | 1/1966 | Heinze et al. | 23—145 |

FOREIGN PATENTS 460,330    1/1937    Great Britain.

OTHER REFERENCES

Foex, "Annales de Chimie," Series 11, Tome 11, 1939, pp. 359–452 (pp. 359, 360, 375, 376, 378, 381, 384 and 442–448 relied on).

Slavyanskii: Pages 1 to 8 of Translation of "Zhurnal Fizicheskoi Khimii," vol. 30, No. 9, 1956, pp. 2046–2050.

Slavyanskii: Pages 1 to 7 of Translation of "Zhurnal Fizicheskoi Khimii," vol. 30, No. 10, 1056, pp. 2248–2250.

HERBERT T. CARTER, Primary Examiner

U.S. Cl. X.R.

23—121, 122